Patented Dec. 3, 1935

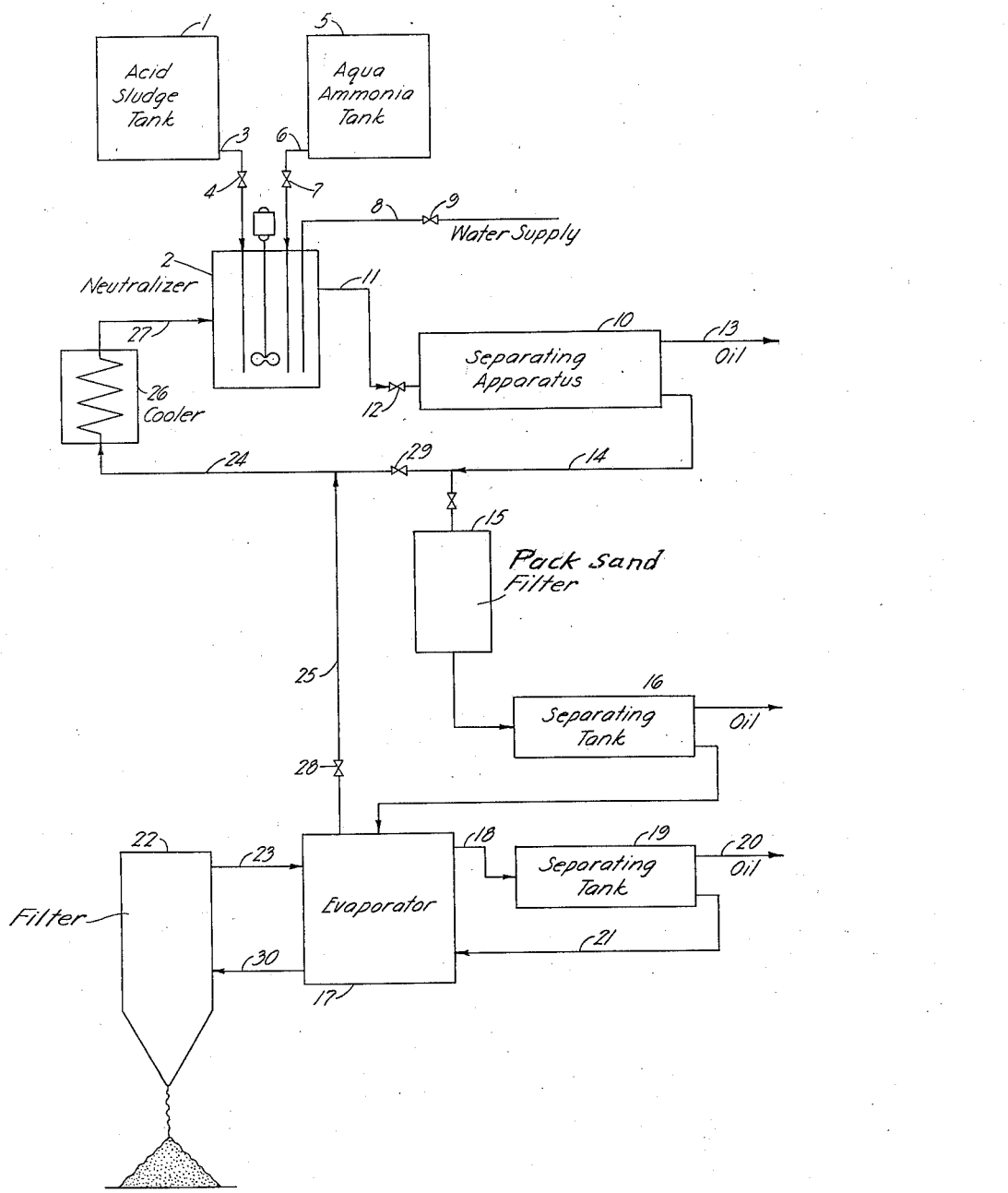

2,022,813

UNITED STATES PATENT OFFICE 2,022,813

PROCESS FOR MANUFACTURE OF AMMONIUM SULPHATE

Jan D. Ruys, Pittsburg, Calif., assignor to Shell Development Company, San Francisco, Calif., a corporation of Delaware Application August 16, 1932, Serial No. 628,969

7 Claims. (Cl. 23—119)

This invention is particularly concerned with the manufacture of ammonium sulphate from acid sludge.

It has been known for a considerable period that if hydrocarbon liquids for instance, petroleum, coal tar or substances derived therefrom are treated with sulphuric acid, sludges are produced which contain considerable quantities of free and combined sulphuric acid. These are commonly known as acid sludges.

It is an object of this invention to provide a process by which high grade ammonium sulphate may be made from acid sludges.

Briefly, my process involves the following steps: neutralizing acid sludge with ammonia to close to zero percent free sulphuric acid in the presence of a large amount of saturated or nearly saturated ammonium sulphate solution, the temperature being maintained below 95° C.; separating and removing the oily matter produced during the neutralization step; thereafter evaporating the ammonium sulphate solution and removing additional oily matter forced from the decreasing body of liquid during evaporation.

In more detail, my process involves numerous other steps as will be apparent from the following description, throughout which, reference is made to the accompanying drawing which is a diagrammatic flow sheet showing arrangement of apparatus suitable for carrying out my process.

In this description I have, as illustration, taken the use of my invention with an acid sludge from the acid treatment of a pressure distillate obtained by cracking petroleum oil; this sludge is treated with aqua ammonia.

Acid sludge from tank (1) is continually led into a neutralizer (2) through line (3) controlled by a valve (4). Aqua ammonia from a tank (5) is also led into the neutralizer (2) by means of a line (6) controlled by a valve (7). A third line (8) controlled by a valve (9) is also connected to the neutralizer so that amounts of water can be introduced into the neutralizer in order to prevent over saturation or over heating. Suitable agitating means are provided in the neutralizer for thoroughly mixing the aqua ammonia with the acid sludge whereby the acid is neutralized by the ammonia forming ammonium sulphate. The reaction is so controlled that the liquid in the neutralizer always contains less than 1% free acid. A part of the contents of the neutralizer is continually withdrawn to a separating apparatus (10) by means of a pipe (11) controlled by a valve (12). In the separating apparatus (10) a thin oil separates from the ammonium sulphate solution. This oil is withdrawn from the surface through pipe (13) and run to storage.

Ammonium sulphate solution with most of the oily matter removed is continually withdrawn from the bottom of the settler through line (14). In order to remove the last traces of free oil the ammonium sulphate solution is passed through a suitable oil filter or agglomerator (15) which may contain sand, clay, charcoal, glass wool, silica gel or other suitable material. In passing through the filter bed, small globules of oil entrained in the ammonium sulphate solution tend to become agglomerated and are either retained within the filter material or slowly flow out with the solution and are removed in a secondary separating tank (16).

It may be advantageous to precede or replace the filtrating by centrifuging. Also instead of using a filter to remove the last traces of free oil, I may employ a suitable organic solvent such as, for instance, carbon tetrachloride. Some dissolved oil as distinguished from free oil remains in the ammonium sulphate solution.

The salt solution, after removal of the free oil, is run into an evaporator (17) in which it is reduced so that crystallization will take place. As crystallization proceeds a thin oily material is forced out of solution. In order that the percentage of this oil does not become too great within the evaporator, part of the liquor within the evaporator is continually withdrawn through line (18) to a separating tank (19). The oily matter floating to the surface is removed through pipe (20) and the aqueous solution returned to the evaporator through line (21). Part of the liquid in the evaporator (17) together with crystals in suspension is continually withdrawn through pipe (30) to a filter or centrifuge (22). In apparatus (22) the crystals of ammonium sulphate are removed from the liquor and the liquor is returned to the evaporator (17) through line (23).

As the reaction in the neutralizer (2) between the ammonia and acid is exothermic it will be necessary to provide cooling in the neutralizer in order to maintain the temperature at the desired point. In order to effect this, cooling coils may be installed directly in the neutralizer although I prefer to cool part of the ammonium sulphate solution and return it to the neutralizer. This ammonium sulphate solution may be withdrawn from line (14) through pipe (24) or from the evaporator (17) through line (25). The withdrawn salt solution, before introduction into the neutralizer, is cooled in a cooler (26). The cooled ammonium sulphate solution is passed into the neutralizer through pipe (27).

In some cases it may be advantageous to return only salt solution withdrawn from the evaporator (17) to the neutralizer in order to prevent accumulation of impurities in the evaporator, which, if allowed to accumulate, would contaminate the salt. Impurities returned to the mixing tank are separated in apparatus (10) or are removed by means of filter (15).

The relative amounts of salt solution returned from line (14) and from the evaporator (17) to the neutralizer can be readily controlled by valves (29) and (28) as will be seen from the drawing.

I prefer to conduct the reaction between the acid and the ammonia in a large amount of ammonium sulphate solution. Also, in order to obtain the best separation of the oil from the ammonium sulphate solution, it has been found that the liquor in the neutralizer should be substantially saturated with ammonium sulphate. Complete saturation would be the best condition for separation, but this condition is conducive to the formation of salt incrustations, so that for large scale operation, the ammonium sulphate concentration must of necessity be maintained slightly below the saturation point.

I have found that the temperature and acidity of the liquid in the neutralizer also have a considerable effect upon the successful working of the process, so that it is necessary to maintain the temperature in the neutralizer below 95° C. and the acidity below 1% free acid in order to obtain a satisfactory separation.

As an example of my working conditions, I have for instance, when using as raw materials 25% aqua ammonia and acid sludge from the treatment of pressure distillate, effected a ready separation of the oily matter and obtained a high grade ammonium sulphate by maintaining the acidity of the neutralizer between 0.0 and 0.2% free acid and the temperature between 80° and 90° C. by the addition of cold saturated ammonium sulphate solution. The ammonium sulphate concentration in the above instance was 47% by weight.

An important feature of my process is that crystallization of the salt is prevented until the salt solution is thoroughly freed from oily matter in suspension. An additional feature of the process is the removal of the "soluble" oil from the evaporating solution during the evaporation step.

While in the above description I have described my process as using aqua ammonia as raw material, it should be understood that by suitable regulation I may use gaseous ammonia or liquid anhydrous ammonia instead of aqua ammonia.

By the term "acid sludge" I do not intend to limit myself to acid sludge obtained by treating pressure distillate but comprehend the use of similar waste material obtained by the treatment of other hydrocarbons with sulphuric acid as before mentioned.

It should also be understood that I may conduct part or all of my process under atmospheric pressure or subatmospheric pressure.

I claim as my invention:

1. In a process for the manufacture of ammonium sulphate from acid sludge, the steps comprising neutralizing acid sludge with ammonia so that the resulting liquid contains between 0% and less than 1% free sulphuric acid, maintaining the temperature below 95° C. during said neutralizing, and effecting said neutralizing in a zone approximately saturated with ammonium sulphate.

2. Process for the manufacture of ammonium sulphate comprising neutralizing acid sludge with ammonia in a container in the presence of a large amount of ammonium sulphate solution, maintaining the temperature of the liquid in said container between 80 and 90° C., maintaining the acidity of the liquid in said container between 0% and 1% free sulphuric acid, maintaining the liquid in said container approximately saturated with ammonium sulphate, separating oily material from the ammonium sulphate solution produced and subsequently evaporating the ammonium sulphate solution and removing additional oily material forced from solution during said evaporation.

3. In a process for the manufacture of ammonium sulphate from acid sludge, the steps comprising neutralizing acid sludge with ammonia so that the resulting liquid contains between 0% and 1% free sulphuric acid, maintaining the temperature below 95° C. during said neutralizing, effecting said neutralizing in a zone approximately saturated with ammonium sulphate, separating the oily matter, produced during said neutralizing from the aqueous liquid, thereafter evaporating said aqueous liquid to obtain solid ammonium sulphate.

4. In a process for the manufacture of ammonium sulphate from acid sludge the steps comprising neutralizing acid sludge with ammonia so that the resulting liquid contains between 0 and 1% free sulphuric acid, maintaining the temperature below 95° C. during said neutralizing, effecting said neutralizing in a zone approximately saturated with ammonium sulphate, separating the oily matter produced during said neutralizing from the aqueous liquid, thereafter evaporating said aqueous liquid to obtain solid ammonium sulphate.

5. In a process for the manufacture of ammonium sulphate from acid sludge the steps comprising neutralizing acid sludge with ammonia so that the resulting liquid contains between 0 and 1% free sulphuric acid, maintaining the temperature between 80 and 90° C. during said neutralizing and effecting said neutralizing in a zone approximately saturated with ammonium sulphate.

6. In a process for the manufacture of ammonium sulphate from acid sludge the steps comprising neutralizing acid sludge with ammonia so that the resulting liquid contains between 0 and .2% free sulphuric acid, maintaining the temperature between 80 and 90° C. during said neutralizing and effecting said neutralizing in a zone approximately saturated with ammonium sulphate.

7. In a process for the manufacture of ammonium sulphate from acid sludge the steps comprising neutralizing acid sludge with ammonia so that the resulting liquid contains between 0 and .2% free sulphuric acid, maintaining the temperature below 95° C. during said neutralizing and effecting said neutralizing in a zone approximately saturated with ammonium sulphate.

JAN. D. RUYS.